March 5, 1957 H. N. HANSEN ET AL 2,784,264

SUPERVISORY EQUIPMENT FOR CARRIER-WAVE TELEPHONE SYSTEMS

Filed Nov. 16, 1953

2 Sheets-Sheet 1

INVENTORS

HENDRIK NICOLAAS HANSEN
FRANZ ANTON VITHA

BY [signature]

AGENT

March 5, 1957 H. N. HANSEN ET AL 2,784,264

SUPERVISORY EQUIPMENT FOR CARRIER-WAVE TELEPHONE SYSTEMS

Filed Nov. 16, 1953 2 Sheets-Sheet 2

INVENTORS
HENDRIK NICOLAAS HANSEN
FRANZ ANTON VITHA 2,784,264

SUPERVISORY EQUIPMENT FOR CARRIER-WAVE TELEPHONE SYSTEMS

Hendrik Nicolaas Hansen and Franz Anton Vitha, Hilversum, Netherlands, assignors to Hartford National Bank and Trust Company, Hartford, Conn., as trustee Application November 16, 1953, Serial No. 392,450

Claims priority, application Netherlands November 17, 1952

6 Claims. (Cl. 179—175.31)

This invention relates to supervisory equipment in carrier-wave telephone systems for supervision, more particularly remote supervision, of amplifiers for go and return traffic respectively in amplifying stations. In carrier-wave telephone systems, the use of such supervision equipment is particularly advantageous, since it permits anomalies of the normal working condition of an amplifying station to be ascertained immediately and remove the cause thereof in a very early phase, thus minimizing the risk of disturbances in the transmission channel, for example due to failure of an amplifying station.

Such supervision equipment is of particular importance for carrier-wave telephone systems, wherein the transmission channel comprises one or more automatically operating amplifying stations such, for example, as is mostly the case in carrier-wave telephony over coaxial lines, cables or the like. Signals from supervisory equipment forming part of different amplifying stations, hereinafter termed "measuring signals" may advantageously be signalled to an end station, which permits supervision of the working condition of the whole carrier-wave telephone system from a central point.

The present invention has for its object to provide supervisory equipment for carrier-wave systems of the type referred to in the preamble to the effect of satisfying simultaneously one or more of the following conditions:

1. Anode current variations of amplifying tubes in an amplifying station should be indicated by the supervisory equipment.
2. Failure of an amplifying tube or undue anode current variations should actuate an alarm device in an end station.
3. During transmission of measuring signals over the carrier-wave telephone cable, measuring signals and further signals transmitted over this cable, for example voice signals, dialling signals and the like, should not influence one another.
4. The transmission of measuring signals is preferably based on the closed circuit principle, in order to further permit indication of disturbances, as the case may be failure of supervisory equipment.
5. Measuring signals from different amplifying stations should be distinguishable from one another.
6. Undue differences of the signal levels of go and return traffic should be signalled by the supervisory equipment and actuate an alarm device.
7. It should also be possible to indicate supply disturbances in the amplifying stations by means of the supervisory equipment.

The supervisory equipment according to the invention comprises a measuring oscillator in which in the frequency-determining circuit a coil with a ferro-magnetic core is connected, which core comprises one or more pairs of premagnetisation windings provided, in differential-connection, in the anode circuits of tubes of different amplifiers, the measuring frequencies taken from the oscillator controlling a frequency indicator which may form part of another station.

Figure 1:
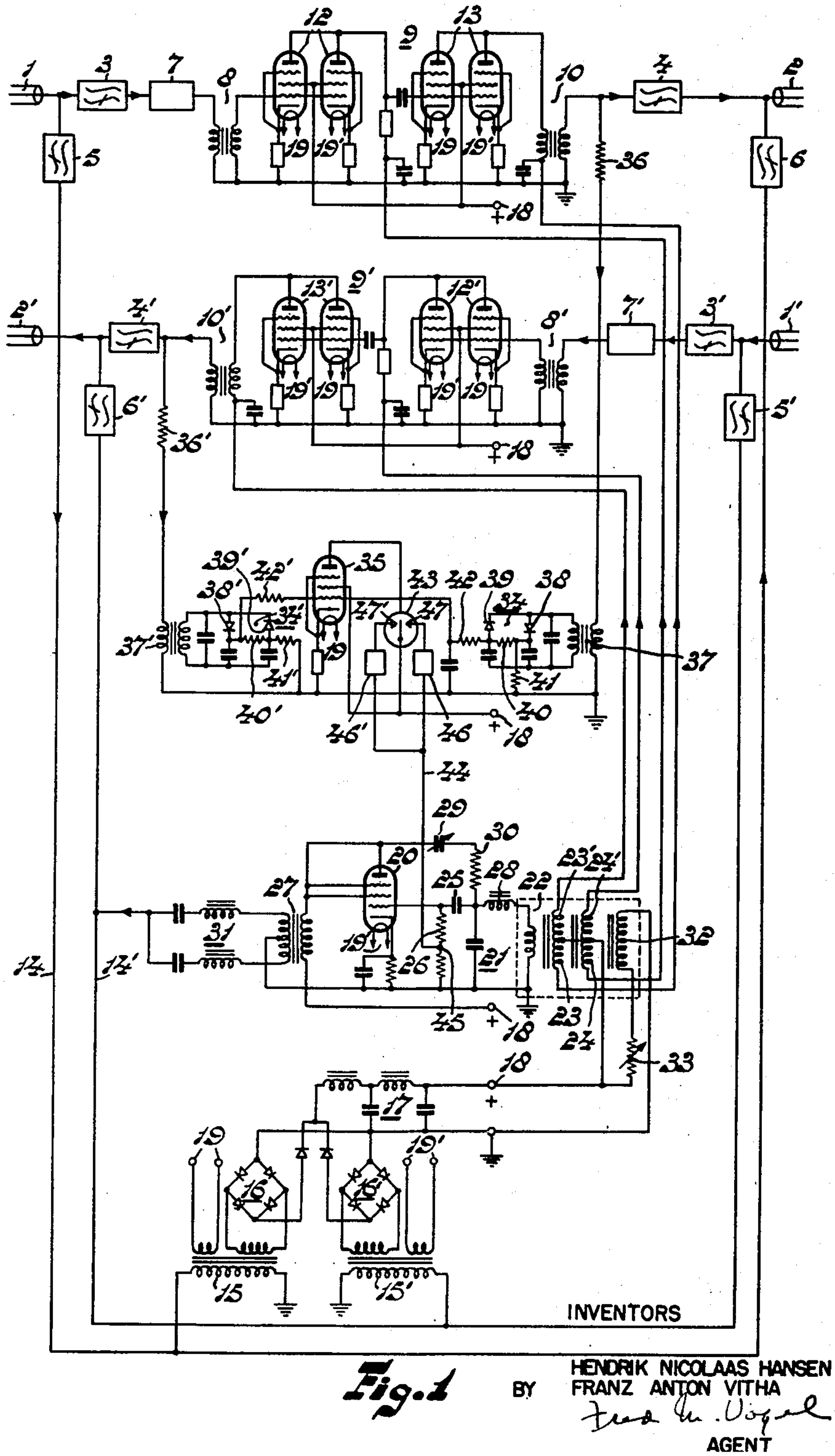
Figure 2:
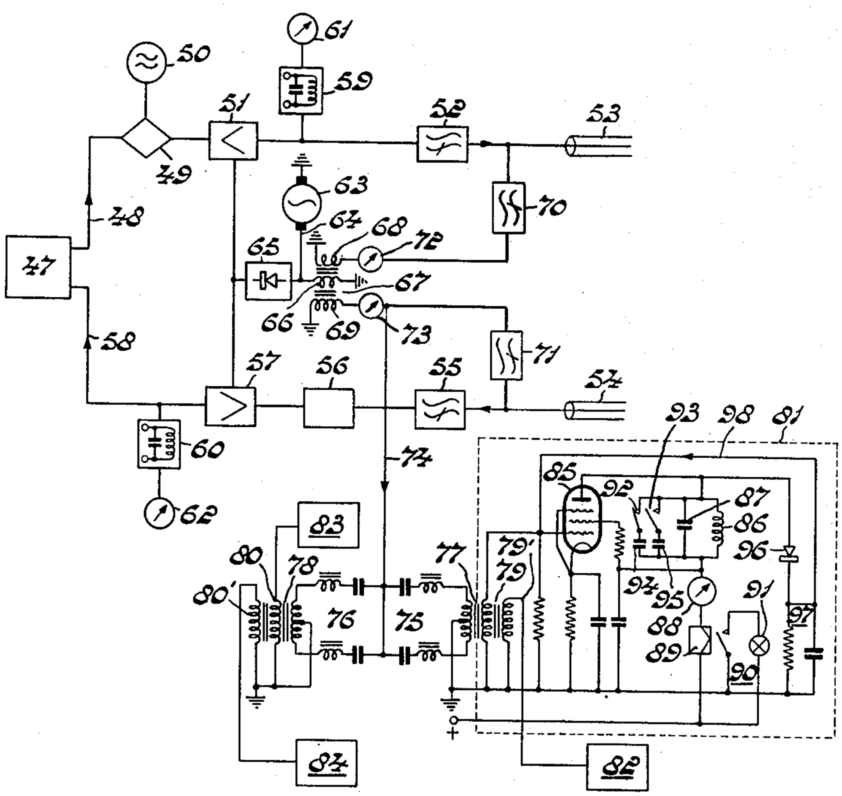

In order that the invention may be readily carried into effect, it will now be described in detail with reference to the accompanying drawings given by way of example, in which Fig. 1 shows an amplifying station located between end stations of a carrier-wave telephony system and comprising supervisory equipment according to the invention, and Fig. 2 shows an end station comprising a frequency indicator co-acting with supervisory equipment.

The amplifying station and end station shown in Figs. 1 and 2 respectively form part of a carrier-wave telephone system in which the voice signals, pilot signals, supply voltages, measuring signals, service calls or the like are transmitted over one single coaxial cable. For these signals the following frequency bands may be employed: 960 voice channels 60 kc./s. to 4 mc./s., with pilot signals which in the present case, may be 60 kc./s., service calls 15 to 21 kc./s. measuring signals 6 to 12 kc./s., supply voltage 50 c./s.

The amplifying station shown in Fig. 1 is designated for go and return traffic, cables 1, 2 serving for go traffic and cables 1', 2' for return traffic. For frequency-separation of the transmitted signals the parallel-connection of a high-pass filter 3, 4 and 3', 4' respectively and a low-pass filter 5, 6 and 5', 6' respectively is connected to each end of the cables 1, 2 and 1', 2' connected to the amplifying station. The high-pass filters 3, 4 and 3', 4' pass only voice signals and pilot signals, whereas the low-pass filters 5, 6 and 5', 6' respectively pass only service calls, measuring signals and supply voltages.

The signals selected by the high-pass filters 3, 3' and supplied over the cables 1 and 1' respectively are supplied via equalization networks 7 and 7' respectively and input transformers 8 and 8' respectively to amplifiers 9 and 9' respectively connected via output transformers 10 and 10' respectively and high-pass filters 4 and 4' respectively to coaxial cables 2 and 2' respectively. The amplifiers 9 and 9' comprise two cascade-connected stages 12, 13 and 12', 13' respectively each comprising two parallel-connected pentodes negatively fed back by cathode impedances.

The connection between the cables 1, 2 and 1', 2' for the other signals, that is to say service calls, measuring signals and supply comprises the low-pass filters 5, 6 and 5', 6' and the leads 14 and 14' respectively connecting these filters.

In the present example, the leads 14 and 14' carry counter-phase voltages of power-line or mains frequency, which voltages are the supply voltages for the supply voltage apparatus of the amplifying station. The amplifying apparatus comprises two transformers 15 and 15' respectively which are connected to the leads 14 and 14' respectively and whose secondary windings are connected to rectifier circuits 16 and 16' respectively, connected in parallel-arrangement to the input of a smoothing filter 17. From an output terminal 18 of the smoothing filter 17 is taken a positive direct voltage supplying the anode voltages and screen voltages for the amplifying tubes of the amplifying station, the filament voltages for the amplifying tube being taken from the secondary winding 19 and 19' respectively.

As shown in Fig. 1, the winding 19 each time supplies the filament voltage for any of the amplifying tubes in each amplification stage 12, 13 and 12', 13' respectively, the filament voltages for the other amplifying tubes of these amplification stations being taken from the winding 19'. In this manner it is ensured that upon failure of any of the supply voltages over the leads 14 and 14' respectively, the amplification stages 12, 13 and 12', 13' yet remain functioning.

The amplifying station comprises a device for remote supervision, for example from an end station, of the amplification stages 12, 13 and 12′, 13′ respectively for go and return traffic.

According to the invention the supervisory equipment comprises a measuring oscillator 20 in which in the frequency-determining circuit 21 a coil 22 with a ferromagnetic core is connected, which core comprises two pairs of premagnetisation windings 23, 23′ and 24, 24′ respectively connected, in differential-arrangement, in the anode circuits of the tubes pertaining to the different amplification stages 12, 12′ and 13, 13′, the measuring frequency taken from the oscillator controlling a frequency-indicator in the end station.

The measuring oscillator is of the Huth-Kühn type in which the frequency-determining circuit 21 is connected, via a grid-capacitor 25 and a grid-resistor 26, to the control-grid of the pentode 20, connected as an oscillator, whilst the anode, suppressor-grid and screen grid are connected, via the primary winding of an output transformer 27, to the positive terminal 18 of the high-voltage supply unit. The frequency-determining circuit 21 comprises, in series with coil 22, a further coil 28 having a temperature-coefficient opposite to that of coil 22 in order to prevent oscillator-frequency variations due to temperature influences.

Connected between the anode- and control grid circuit of the oscillator-arrangement is a feed-back circuit comprising the series-arrangement of a capacitor 29 and a resistor 30. It has been found that the resistor 30 counteracts amplitude variations of the oscillations produced by the oscillator.

For remote supervision of the amplification stages 12, 13 and 12′, 13′ the output transformer 27 of the measuring oscillator 20 is connected to the lead 14′ via a band-pass filter 31 with a pass-band of 6 to 12 kc./s., which consequently constitutes a locking filter with respect to supply voltages of 50 c./s. and service calls in the frequency band of 15 to 21 kc./s. The oscillator measuring frequency is supplied over the lead 14′ to the coaxial cable 1′ and 2′ respectively to which the frequency-indicator referred to is connected in one end station.

In the supervisory equipment so far described, the anode currents of the amplifying tubes 12, 13 and 12′, 13′ respectively for go and return traffic are compared in the premagnetisation windings 23, 23′ and 24, 24′ on the core of coil 22, which windings are provided in differential arrangement in the anode circuits of the amplification stages 12, 12′ and 13, 13′.

Anode current variations of an amplifying tube in the stages 12, 13 and 12′, 13′ involves self-inductance variations of the coil 22 in the frequency-determining circuit of the oscillator-indicator, which results in a corresponding oscillator-frequency variation. This consequently permits anode current variations of an amplifying tube to be ascertained immediately in the end station where the oscillator frequency is indicated on the frequency-indicator co-operating with the supervisory equipment.

The risk of anode current variations of two or more amplifying tubes to the effect of oscillator-frequency variations thus produced compensating each other substantially is practically very small, hence the frequency of the measuring oscillator 20 clearly shows the working condition of the tubes in the amplification stages 12, 12′ and 13, 13′.

Said anode current variations are mostly due to ageing of an amplifying tube in the amplification stages 12, 13 and 12′, 13′. Since the ageing of an amplifying tube involves a decrease in anode current, the supervisory equipment set out permits of deducing from the measuring frequency whether such a tube forms part of the amplifier 12, 13 for go traffic or of the amplifier 12′, 13′ for return traffic. To this end the ferromagnetic core of coil 22, independently of the premagnetisation caused by the premagnetisation windings 23, 23′ and 24, 24′ in differential arrangement, is premagnetised in such manner that oppositely directed anode current variations of the tubes to be supervised involve oppositely directed measuring frequency variations. This permits of distinguishing between the ageing of an amplifying tube in the amplifier cascade 12, 13 for go traffic or in the amplifier cascade 12′, 13′ for return traffic, since they cause opposite variations of the oscillator measuring frequency.

The desired premagnetisation of the coil of core 22 is obtained with the use of a premagnetisation winding 32 connected, via a variable series-resistor 33, to the terminals 18 of the high-voltage supply unit. For said purpose the coil core may alternatively be premagnetised by a permanent magnet.

For supervision of the amplification of the amplifiers in the carrier-wave telephone system use is made of pilot signals transmitted together with voice signals. In the amplifying station referred to, supervision is possible by supplying pilot signals, which are taken from the amplifiers 12, 13 and 12′, 13′ for go traffic and return traffic respectively, by way of rectifier arrangements 34, 34′ to a difference producer 35 whose output difference voltage, upon exceeding a threshold value, unlocks a normally locked up pilot alarm generator supplying a pilot alarm voltage by which the measuring oscillator 20 is locked up periodically.

The pilot signals produced at the output transformer 10, 10′ of the amplifiers 12, 13 and 12′, 13′ are supplied through series-resistors 36, 36′ to transformers 37, 37′ comprising secondary windings which are tuned to the pilot frequency and connected to the rectifier arrangement 34, 34′ referred to. The rectifier arrangements 34, 34′ comprise two oppositely directed rectifying cells 38, 39 and 38′, 39′ with an output circuit comprising resistors 40 and 40′ respectively, one end of which is connected to earth by way of resistors 41 and 41′ respectively. At the other end of the output resistors 40 and 40′ respectively is set up a direct voltage of negative or positive polarity, which is supplied by way of series-resistors 42 and 42′ respectively to the control-grid of the difference producer constituted by the pentode 35 whose anode circuit comprises a contact voltmeter 43 for unlocking the pilot alarm generator. The output circuit of the pilot alarm generator is connected through a lead 44 to a tapping point 45 of the grid resistor 26 of the measuring oscillator 20 and consequently locks up, upon release, the measuring oscillator 20.

Since relative level differences of the amplified pilot signals are mostly due to a decrease in amplification of any of the amplification stages it is also in this instance possible to localize the failing amplifier 12, 13 or 12′, 13′. To this end, two pilot alarm generators 46 and 46′ respectively in the amplifying station referred to are connected to different contacts 47 and 47′ respectively of the contact voltmeter 43, either one of said pilot alarm generators being unlocked in accordance with the polarity of the difference voltage. Both pilot alarm generators cause the measuring oscillator 20 to be locked up with different periodicity, say 1 c./s. and 3 c./s. If, for example, the level of the pilot oscillations at the output of the amplifier 12, 13 in the amplifying station referred to decreases by 4 db, the pilot alarm generator 46 is connected and the measuring oscillator 20 is connected and disconnected with a periodicity of 1 c./s. In the other case, the pilot alarm generator for 3 c./s. is unlocked, the periodicity of the locking of the measuring oscillator thus indicating the failing amplifier 12, 13 or 12′, 13′. For releasing the pilot alarm generators 46 and 46′ respectively the parallel-connection of a maximum and a minimum relay may alternatively be substituted for the contact-voltmeter 43.

The supervisory equipment referred to also permits of indicating power supply disturbances. To this end, in the supervisory equipment referred to, the filament voltage for the pentode 35 of the winding 19 is taken from the supply apparatus, whereas the filament voltage for the measuring oscillator 20 is supplied by the winding 19'. Upon failure, for example, of the supply voltage through the lead 14', the measuring oscillator 20 is disconnected, and in the case of failure of the supply voltage through the lead 14 the pentode 35 is disconnected, thus unlocking the pilot alarm generator 46', by which the measuring oscillator is locked up with a periodicity of 3 c./s. At the end station it is possible to ascertain, as will be explained hereinafter, whether a pilot disturbance or a supply disturbance is concerned in the last-mentioned case.

When using a plurality of amplifying stations in the transmission channel, each amplifying station may comprise supervisory equipment of the aforesaid type, the measuring oscillators being tuned to different frequencies in order to permit of distinguishing between the measuring signals of the several stations. For said different measuring frequencies the frequency band of 6 to 12 kc./s. is reversed.

Summarizing, the supervisory equipment indicates the nature of the disturbance (anode current variations, pilot disturbance or supply disturbance) and the disturbed amplifying station, the produced measuring signals moreover permitting location of the defect in the disturbed amplifying station (amplifier 12, 13 amplifier 12', 13', supply apparatus) to be determined.

In the supervisory equipment referred to, it is alternatively possible to substitute, for example, Collpitt or Hartley oscillators or the like for Huth-Kühn oscillators.

Fig. 2 shows an end station of the carrier wave telephone system comprising four frequency indicators for handling measuring signals from the supervisory equipment said frequency indicators being provided in four amplifying stations situated in the transmission channel.

In the end station referred to, the output signals from terminal apparatus 47 for 960 voice channels, are supplied by way of a lead 48 and a pilot frequency generator 50 connected thereto to an amplifier 51 whose output circuit is connected to a coaxial cable 53 via a high-pass filter 52.

The incoming voice signals from a coaxial cable 54 are supplied via a high-pass filter 55, an equalization network 56, an amplifier 57 and a lead 58 to the terminal apparatus 47. Connected to the outputs of the amplifiers 51 and 57 are pilot receivers for supervision of the level of the pilot signals, each pilot receiver comprising the cascade-arrangement of circuits 59 and 60 respectively, tuned to the pilot frequency, and indicating devices 61 and 62 respectively.

The supply voltages of the carrier-wave apparatus are produced by a generator 63 having the frequency of 50 c./s. This generator may be connected on the one hand via the lead 64 to the supply apparatus 65 of the end station and on the other hand to the primary 66 of a transformer 67 having two secondary windings 68, 69 which are connected to the coaxial cables 53 and 54 via low-pass filters 70 and 71 respectively. For load supervision of the amplifying stations connected to the coaxial cables, indicating devices 72 and 73 respectively are provided in series with each of the secondary windings 68, 69.

In the end station referred to, the incoming measuring signals from the coaxial cable 54 are supplied via the low-pass filter 71 and lead 74 to two equal band-pass filters 75, 76 connected in parallel-arrangement to the lead 74, the output circuits of said band-pass filters comprising transformers 77 and 78 respectively with two secondary windings 79, 79' and 80, 80' respectively. The band-pass filters 75, 76 have a pass-band of 6 to 12 kc./s. and consequently act as blocking filters with respect to supply voltages of 50 c./s.

Connected to the secondary windings 79, 79' and 80, 80' respectively of the transformers are the frequency indicators 81, 82, 83 and 84 adjusted respectively to the frequency of a measuring frequency produced by the supervisory equipment in a given amplifying station. For example, the frequency indicators 81, 82, 83 and 84 respectively are set to frequencies of 7, 9, 8 and 10 kc. respectively.

The frequency indicators 81, 82, 83 and 84 are made up in the same manner. The drawing shows a detailed diagram only of the frequency indicator 81, which will be described hereinafter.

In this frequency indicator, the measuring frequencies from the secondary winding 79 of the transformer 77 are supplied to the control grid of a pentode 85 connected as an amplifier, the anode circuit comprising the series-connection of an oscillatory circuit comprising an inductance 86 and capacity 87, an anode current meter 88 and a relay 89 controlling an alarm device 90 with a ringing signals device 91. In parallel with the circuit capacitor 87 are connected two branches each consisting of the series-arrangement of switches 92 and 93 respectively and capacitors 94 and 95 respectively, the switch 92 normally being closed and the switch 93 being open. In this instance, the oscillatory circuit is tuned to a frequency produced by the measuring oscillator in the normal working condition of the amplifying station concerned.

In the frequency indicator referred to, a rectifier 96 with an output impedance 97 is connected in parallel with the oscillatory circuit 86, 87, the direct voltage of positive polarity obtained by rectification being supplied through the lead 98 to the control grid of pentode 85. In the normal working condition of the amplifying station concerned, the voltage across the circuit 86, 87 will consequently be a maximum and involve a maximum direct voltage through the impedance 85, which results in a maximum anode current.

If the measuring frequency produced by the measuring oscillator changes due to anode current variations of an amplifying tube in the amplifying station concerned, this involves a decrease in anode current of the pentode 85, which decrease can be read off on the indicating device 88. If this change of the measuring frequency exceeds a given threshold value, for example due to failure of an amplifying tube in the amplifying station concerned, the relay 89 responds and the ringing signal device 91 produces a continuous alarm signal (tube alarm). In the frequency indicator referred to, connection of the capacitor 95 or disconnection of the capacitor 94 in the oscillatory circuit 86, 87 permits of verifying whether the measuring frequency has decreased or increased. As has been set out with reference to Fig. 1, a decrease or an increase of the measuring frequency is indicative of whether the discrepancy occurs in the amplification stages for go traffic or in those for return traffic.

Amplification discrepancies of the amplification stages for go traffic and return traffic are characterized, as has been stated above, by periodical interruption of the measuring frequency in the rhythm of the frequency of any of the pilot alarm generators. The relay 89 in the frequency indicator therefore responds periodically with the result that the ringing signal device 91 produces an intermittent alarm signal (pilot alarm) whose periodicity (1 c./s. or 3 c./s.) indicates whether the disturbance occurs in the amplification stages for go traffic or in those for return traffic.

If a discrepancy of the anode current of an amplifying tube and an amplification variation occur simultaneously in the amplifying station in question, the frequency indicator produces only a continuous signal (tube alarm), the intermittent pilot alarm resulting from detuning of the oscillatory circuit by means of the switches 92 and 93 respectively.

Supply disturbances in the amplifying station manifest themselves by failure of the measuring frequency, or as the case may be intermittent interruption of the measuring frequency, and consequently produce a continuous, or as the case may be, an intermittent alarm in the frequency indicator. Such defects are readily distinguishable by the deflection of the load meters 72, 73.

Summarizing, the disturbed amplifying station and the location of the defect in this amplifying station (amplification stages for go traffic or return traffic, or supply apparatus) are indicated by the frequency indicators 81, 82, 83 and 84.

As an alternative, other types of indicators, for example comprising two guard circuits, may be substituted for the type of frequency indicator referred to. The frequency indicator set out above has the advantage of needing only one relay and one alarm device.

What is claimed is:

1. In a carrier-wave telephone system wherein an amplifying station is provided with first and second circuits for transmitting signals in two directions, and wherein said station is supervised from a remote location in said system, apparatus comprising an oscillator for producing a measuring signal having a tuned circuit including a coil having a premagnetized ferromagnetic core, an amplifier in each of said first and second circuits for amplifying the signals in said telephone system, said amplifiers each including an electron discharge device having an anode and a circuit therefore, first and second windings connected differentially in the anode circuits of said first and second devices respectively and enclosing said core for varying the inductance of said coil in accordance with current variations in the anodes of said devices, a frequency indicator at said remote location, and means for coupling the output of said measuring oscillator to said frequency indicator.

2. Apparatus, as set forth in claim 1, including means to premagnetize said ferromagnetic core to a value at which oppositely directed anode current variations of said electron discharge devices produce oppositely directed measuring frequency variations.

3. Apparatus, as set forth in claim 1, wherein said transmitting signals include a pilot signal employed for supervision of the operation of said amplifiers, and further including a plurality of rectifiers, a voltage difference producer for providing an output difference voltage, means for supplying the pilot signal through said first circuit and through one of said rectifiers to said difference producer, means for supplying the pilot signal through said second circuit and through another of said rectifiers to said difference producer, a normally blocked pilot alarm generator coupled to the output of said difference producer and providing a pilot alarm voltage, said pilot alarm generator being unblocked upon the reception of the output difference voltage between said pilot signal when said difference voltage exceeds a predetermined value, means for coupling the output of said pilot alarm generator to said measuring oscillator, and means for rendering said measuring oscillator inoperative periodically during the reception of said pilot alarm voltage.

4. Apparatus, as set forth in claim 3, further including a second normally blocked pilot alarm generator for supplying a pilot alarm voltage to render said measuring oscillator periodically inoperative, the periodicity being different from the periodicity caused by the pilot alarm voltage from the other of said generators, and means for unblocking the first of said pilot generators upon the reception of one polarity of the output difference voltage and for unblocking the second of said pilot generators upon the reception of the reverse polarity of the output difference voltage.

5. Apparatus, as set forth in claim 3, further including a second amplifier connected in parallel with each of said first and second circuit amplifiers, heaters respectively in each of said amplifiers, and a source of heater supply voltages having two separate outputs, the heaters of each of the parallel-connected amplifiers being supplied by respective outputs of said source, said difference producer including an electron discharge device having a heater supplied by one of the outputs of said source and said measuring oscillator having an electron discharge device having a heater supplied by the other of said two outputs.

6. Apparatus, as set forth in claim 1, wherein said frequency indicator comprises an electron discharge device having input and output circuits, the output of said measuring oscillator being coupled to said input circuit, an alarm device, said output circuit comprising an oscillatory circuit tuned to the normal operating frequency of said measuring oscillator and a relay circuit connected in series with said oscillatory circuit, said relay circuit being coupled to and controlling the output of said alarm device, a rectifier circuit connected in parallel with said oscillatory circuit to rectify the oscillations thereacross, and means for applying the positive polarity of said rectified oscillations to said input circuit.

No references cited.